(12) United States Patent
Ase et al.

(10) Patent No.: US 6,631,656 B2
(45) Date of Patent: Oct. 14, 2003

(54) HANDLEBAR SWITCH MOUNTING STRUCTURE

(75) Inventors: Yukimi Ase, Saitama (JP); Yoji Kanaoka, Saitama (JP); Koji Kano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 65 days.

(21) Appl. No.: 09/922,867

(22) Filed: Aug. 7, 2001

(65) Prior Publication Data

US 2002/0014565 A1 Feb. 7, 2002

(30) Foreign Application Priority Data

Aug. 7, 2000 (JP) ........................................ 2000-239063

(51) Int. Cl.[7] .............................................. B62K 21/12
(52) U.S. Cl. ...................................................... 74/551.8
(58) Field of Search ............................... 74/502.2, 551.8

(56) References Cited

U.S. PATENT DOCUMENTS

| | | | | |
|---|---|---|---|---|
| 1,735,212 A | * | 11/1929 | Pawsat | 248/229.24 |
| 3,601,395 A | * | 8/1971 | Morgan | 272/73 |
| 3,832,912 A | * | 9/1974 | Edwards | 74/551.8 |
| 3,945,337 A | * | 3/1976 | Sweetman | 116/36 |
| 4,458,115 A | * | 7/1984 | Peterson | 200/61.85 |
| 4,710,599 A | * | 12/1987 | Motodate et al. | 200/61.85 |
| 5,377,558 A | * | 1/1995 | Harris | 74/551.8 |
| 5,904,442 A | * | 5/1999 | Takeda | 403/392 |
| 6,167,774 B1 | * | 1/2001 | Gagnon et al. | 74/473.12 |
| 6,225,584 B1 | * | 5/2001 | Ase et al. | 200/61.54 |

FOREIGN PATENT DOCUMENTS

| | | | | |
|---|---|---|---|---|
| EP | 50085 A | * | 4/1982 | H01H/9/06 |
| JP | Y2-5759426 | | 12/1982 | |

* cited by examiner

Primary Examiner—Chong H. Kim
(74) Attorney, Agent, or Firm—Birch, Stewart, Kolasch & Birch, LLP

(57) ABSTRACT

A handlebar switch mounting structure capable of firmly attaching a handlebar switch unit on a handlebar pipe and to improve the outward appearance of the handlebar switch. The handlebar switch mounting structure includes a first bracket having a circular portion which can be attached on substantially a half of the periphery of the handlebar pipe portion and front and rear flange portions and extended from both ends of the circular portion. The second bracket is provided that includes a circular portion which can be attached on the remaining half of the periphery of the handlebar pipe portion. The first and second brackets are securely fixed on the handlebar pipe portion by joining the second bracket to the first bracket set on the handlebar pipe portion. With the front and rear flange portions sandwiched together, the first and second case halves are joined and then attached to the handlebar pipe portion through the front and rear flange portions.

14 Claims, 9 Drawing Sheets

HANDLEBAR SWITCH MOUNTING STRUCTURE

CROSS-REFERENCE TO RELATED APPLICATIONS

The present application claims priority under 35 USC 119 to Japanese Patent Application No. 2000-239063 filed on Aug. 7, 2000 the entire contents thereof are hereby incorporated by reference.

BACKGROUND OF THE INVENTION

1. Field of the Invention

The present invention relates to a split handlebar switch mounting structure for installation on the handlebar of for instance a motorcycle.

2. Description of Background Art

There has been proposed an improved art of a handlebar switch case as set forth, for example, in Japanese Utility Model No. Sho 57-59426 Handlebar Switch Case For Motorcycle. FIG. 4 illustrated in this utility model application will be used herein with the designations of members changed.

FIG. 10 is a sectional view showing a conventional handlebar switch mounting structure. A handlebar switch 100 is of such a design that, with a bracket 102 set on a handlebar 101, a first case half 103 made of an alloy is attached by bolts 104, 104 to a first lug 102a of the bracket 102, then the handlebar 101 is tightened by the bracket 102 and the first case half 103, thereby firmly fastening the first case half 103 to the handlebar 101.

Subsequently, a second case half 105 is installed by bolts 106, 106 to a second lug 102b of the bracket 102, thus installing the second case half 105 to the handlebar 101.

According to the handlebar switch 100, since the first case half 103 is made of an alloy, it is possible to reliably install the first case half 103 to the handlebar 101 by firmly tightening the bracket 102.

Furthermore, the second case half 105 can be reliably installed, like the first case half, to the handlebar 101 by attaching the second case half 105 to the bracket 102.

The first and second case halves 103 and 105 of the handlebar switch 100, however, are produced of different kinds of materials, and therefore there exists a difference in the outward appearance between the first case half 103 and the second case half 105. The outward appearance of the handlebar switch 100 is hard to improve; therefore the practical use of the handlebar switch 100 of an improved outward appearance is in demand depending on the type of motorcycle.

In some handlebar switch mounting structure, the material of the first case is changed from alloy to resin for the purpose of improving the outward appearance of the handlebar switch.

The first and second case halves can be matched with each other in external appearance by thus forming the first case half of the same resin as the second case half, thereby improving the outward appearance of the handlebar switch. In the next drawing, the handlebar switch will be explained.

FIG. 11 is a sectional view showing a conventional handlebar switch mounting structure. In a handlebar switch 110, a bracket 111 is positioned by a lock pin 112 on a handlebar 113. Flange portions 114, 114 of the bracket 111 are so set as to be sandwiched by both a first case half 115 and a second case half 116. Screws 117a and 117b are inserted into through holes 116a and 116b of the second case half 116. Thereafter, the screws 117a and 117b thus inserted are screwed into screw holes 115a and 115b of the first case half 115.

A circular portion 115c of the first case half 115 is thus pressed against the upper half of the periphery of the handlebar 113, and a circular portion 116c of the second case half 116 is pressed against the lower half of the periphery of the handlebar 113.

The first and second case halves 115 and 116 can be thus mounted unrotatably on the handlebar 113.

There is a certain amount of clearance between the lock pin 112 installed on the handlebar 113 and the mounting hole of the handlebar 113. Therefore, to install the first and second case halves 115 and 116 unrotatably on the handlebar 113, it is necessary to firmly press the circular portion 115c of the first case half 115 and the circular portion 116c of the second case half 116 against the handlebar 113.

Therefore, it is necessary to provide a clearance S1 for instance between the flange portion 114, 114 of the bracket 111 and the opposite surface 116d, 116d of the second case half 116, and to firmly tighten by the screws 117a and 117b the first and second case halves 115 and 116.

However, the presence of the clearance S1 between the flange portion 114, 114 and the opposite surface 116d, 116d impairs the outward appearance. To improve the outward appearance, the screws 117a and 117b must be firmly tightened to reduce or eliminate the clearance S1.

Therefore the first and second case halves 115 and 116 are sometimes subject to deformation, which will adversely affect the outward appearance of the handlebar switch 110.

SUMMARY AND OBJECTS OF THE INVENTION

It is, therefore, an object of the present invention to provide a handlebar switch mounting structure which has good outward appearance and can be reliably mounted on the handlebar.

To attain the above-described object, a split handlebar switch mounting structure is provided for mounting the handlebar switch on the handlebar by joining the second case half made of a resin to the first case half made of a resin. The handlebar switch mounting structure is provided with the first bracket having a circular portion so formed so as to be attached on about a half of the periphery of the handlebar with a pair of flange portions protruding from both ends of the circular portion. The second bracket includes at least the circular portion so formed so as to be attached on the remaining half of the periphery of the handlebar. The second bracket is joined to the first bracket placed on the handlebar, thereby securing the first and second brackets on the handlebar. Then the first and second case halves are joined to sandwich the flange portion, thereby mounting the first and second case halves to the handlebar through the flange portion.

The first and second brackets are secured on the handlebar, thus permitting the firm attachment of the first and second brackets to the handlebar. Then, the first and second case halves are attached to the flange portion of the first bracket installed firmly on the handlebar. Therefore the first and second case halves can be firmly attached to the handlebar.

Furthermore, since the first and second brackets are fixed on the handlebar, there is no need to tighten the handlebar by the first and second case halves. It is, therefore, possible to prevent deformation of the first and second case halves without applying an unnecessarily great tightening force to the first and second case halves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
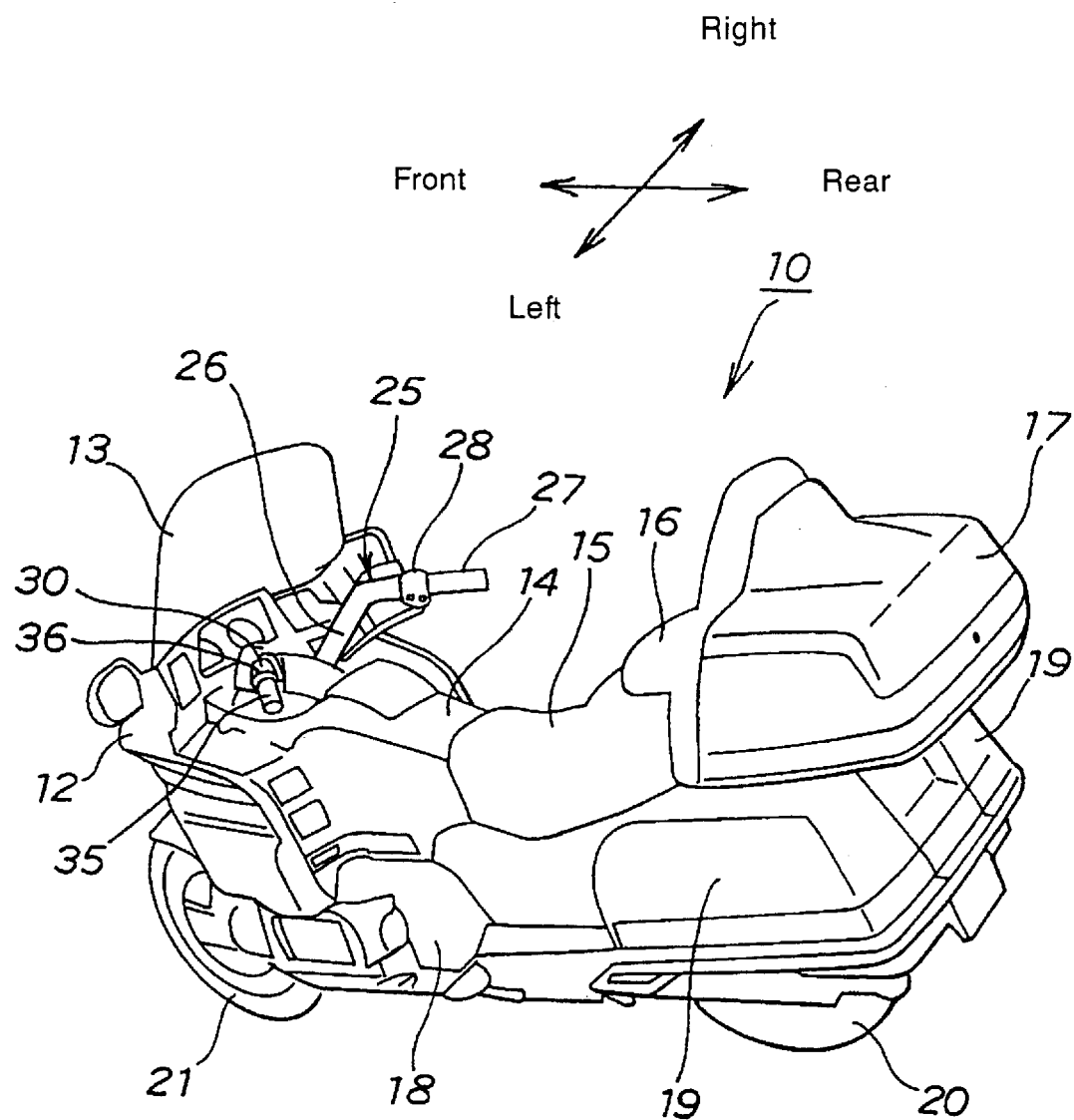
FIG. 1 is a perspective view of a motorcycle equipped with the handlebar switch mounting structure according to the present invention.

The preferred embodiment of the present invention will be explained with reference to the accompanying drawings. FIG. 1 is a perspective view of a motorcycle equipped with the handlebar switch mounting structure of the present invention. The motorcycle 10 is equipped with a front fairing 12 attached at the front part of the vehicle body; a windshield 13 attached above the front fairing 12; a fuel tank 14, a rider's seat 15, a pillion's seat 16, and a rear box 17 mounted in this order from the front fairing 12 toward the rear. An engine 18 is mounted below the fuel tank 14. Right and left side boxes 19, 19 are mounted below the rear box 17. The side boxes 19, 19 cover the upper part of a rear wheel 20. A steering handlebar 25 is installed on the upper portion of the front fork which supports a front wheel 21.

The steering handlebar 25 is a separate type including a right handlebar 26 and a left handlebar 30. The right handlebar 26 is provided with a right switch panel 28 which has, near a right grip 27, a STARTER/REVERSE switch and a REVERSE SHIFT SWITCH. The left handlebar 30 will be explained in detail by referring to FIG. 2.

Figure 2:
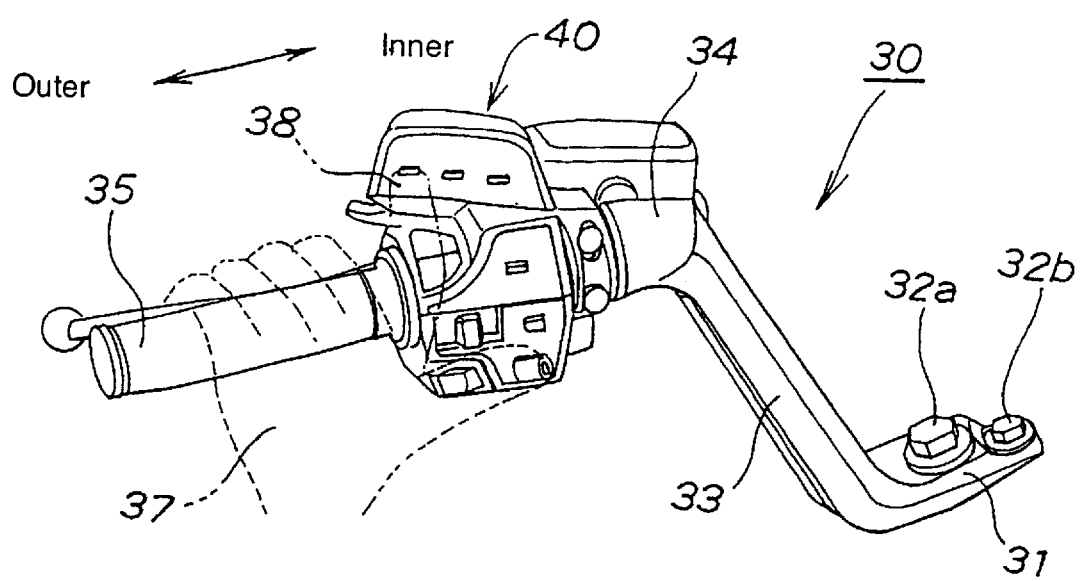
FIG. 2 is a side view of a left handlebar equipped with the handlebar switch mounting structure according to the present invention.

FIG. 2 is a side view of the left handlebar on which the handlebar switch mounting structure of the present invention is mounted. The left handlebar 30 includes a mounting portion 31 that is secured by bolts 32a and 32b to an unillustrated top bridge of the vehicle body. An inclined portion 33 rises obliquely upwardly toward the outside from the mounting portion 31. A handlebar (handlebar pipe portion) 34 extends horizontally towards the outside from the inclined portion 33. A left grip 35 is mounted on the end portion of the handlebar pipe portion 34, and a handlebar switch (handlebar switch unit) 40 mounted in the vicinity of the left grip 35.

The handlebar switch unit 40 is mounted adjacent to the left grip 35 of the handlebar pipe portion 34. The rider, therefore, can easily operate each of the switches on the handlebar switch unit 40 by using a finger while gripping the left grip 35 by the left hand 37.

Figure 3:
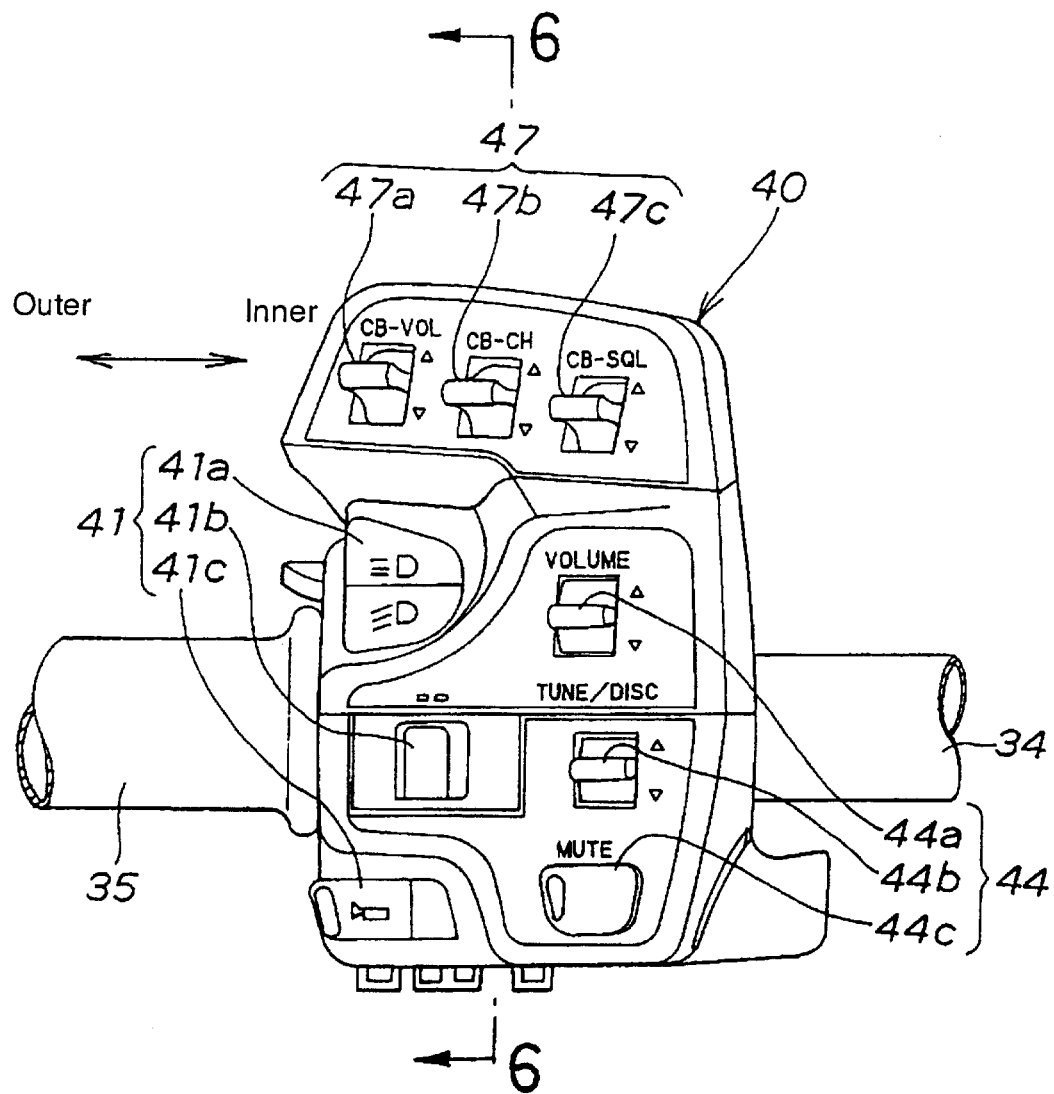
FIG. 3 is a front view of the handlebar switch mounting structure of the present invention.

FIG. 3 is a front view of the handlebar switch mounting structure according to the present invention. The handlebar switch unit 40 is provided with an indication-warning system switch cluster 41 located near the left grip 35, an audio switch cluster 44 is located on the right of the indication-warning system switch cluster 41, that is, removed from the left grip 35. A wireless communication switch cluster 47 is located above the indication-warning system switch cluster 41 and the audio switch cluster 44.

The indication-warning system switch cluster 41 includes a dimmer switch 41a placed on the upper stage, a winker switch 41b placed on the middle stage, and a horn switch 41c placed on the lower stage.

The audio switch cluster 44 is a switch cluster for operating a radio, CD (compact disk) player, and audio tape deck, including a volume control switch 44a placed on the upper stage, a station-selection switch 44b placed on the middle stage, and a mute switch 44c placed on the lower stage.

Furthermore, the wireless communication switch cluster 47 includes a wireless volume switch 47a located near the left grip 35, a wireless channel switch 47b placed nearly at the center, and a wireless squelch switch 47c placed far from the left grip 35.

Figure 4:
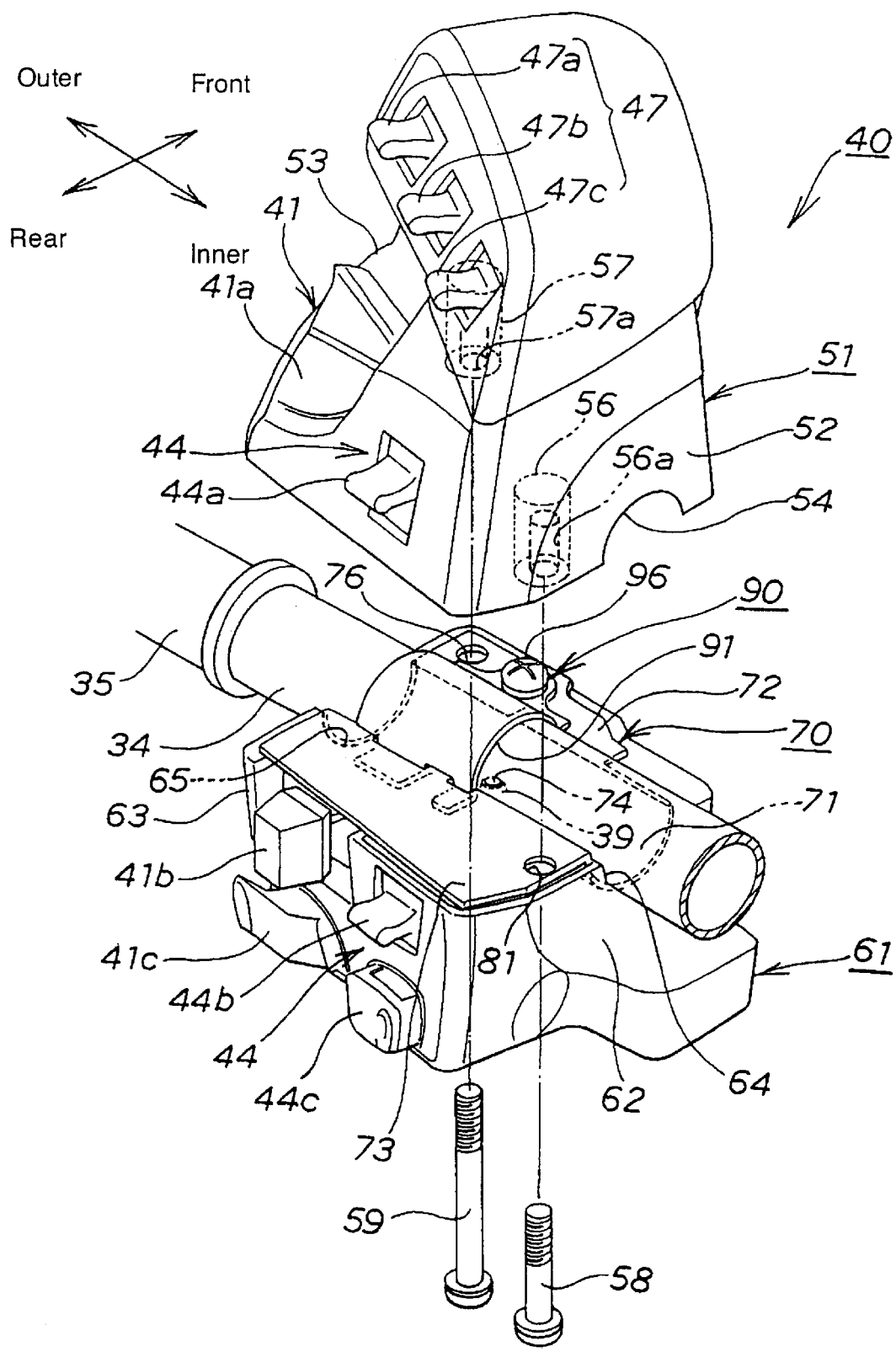
FIG. 4 is an exploded perspective view of the handlebar switch mounting structure according to the present invention.

FIG. 4 is an exploded perspective view of the handlebar switch mounting structure according to the present invention. The mounting structure of the handlebar switch unit 40 is a split type designed to be installed on the handlebar pipe portion 34 by joining the second case half 61 made of a resin to the first case half 51 made of a resin.

The mounting structure for mounting the handlebar switch unit 40 includes the first bracket 70 inclusive of a circular portion 71 which can be attached on nearly a half of the periphery (i.e., the lower half of the periphery) of the handlebar pipe portion 34 and a pair of flange portions (front and rear flange portions) 72 and 73 extended from both ends of the circular portion 71. The second bracket 90 includes at least a circular portion 91 which can be attached on the remaining half of the periphery (i.e., the upper half of the periphery) of the handlebar pipe portion 34. The first and second brackets 70 and 90 are securely fixed with a frictional force on the handlebar pipe portion 34 by mechanically joining the second bracket 90 to the first bracket 70 set on the handlebar pipe portion 34. Thereafter, the first and second case halves 51 and 61 are attached to the handlebar pipe portion 34 through the front and rear flange portions 72 and 73 by mechanically joining the first and second case halves 51 and 61 with the front and rear flange portions 72 and 73 sandwiched therebetween.

The first case half 51 is made of a resin and is a member forming the upper half of the handlebar switch unit 40. The first case half 51 is provided with a dimmer switch 41a of the indication-warning system switch cluster 41, a volume control switch 44a of the audio switch cluster 44, and furthermore a wireless volume switch 47a, a wireless channel switch 47b and a wireless squelch switch 47c of the wireless communication switch cluster 47.

The first case half 51 made of a resin has the inner and outer circular portions 54 and 55 (only the inner circular portion 54 is shown) on the inner wall 52 and the outer wall 53, and built-in metal screw members 56 and 57 inside.

The inner and outer circular portions 54 and 55 are so formed so as to cover nearly half of the periphery (i.e., the upper half of the periphery) of the handlebar pipe portion 34. The screw members 56 and 57 have internal threads 56a and 57a for installation of the screws 58 and 59.

The second case half 61 made of a resin and is a member forming the lower half of the handlebar switch unit 40. The second case half 61 is provided with a winker switch 41b and a horn switch 41c of the indication-warning system switch cluster 41, and a station-selection switch 44b and a mute switch 44c of the audio switch cluster 44.

Figure 7A:
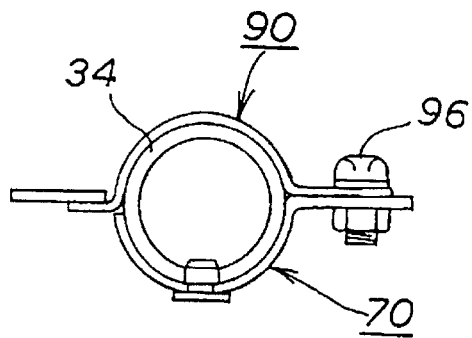
FIGS. 7(a) and 7(b) are views explaining the second installation procedure for installing the handlebar switch mounting structure according to the present invention.
Figure 7B:
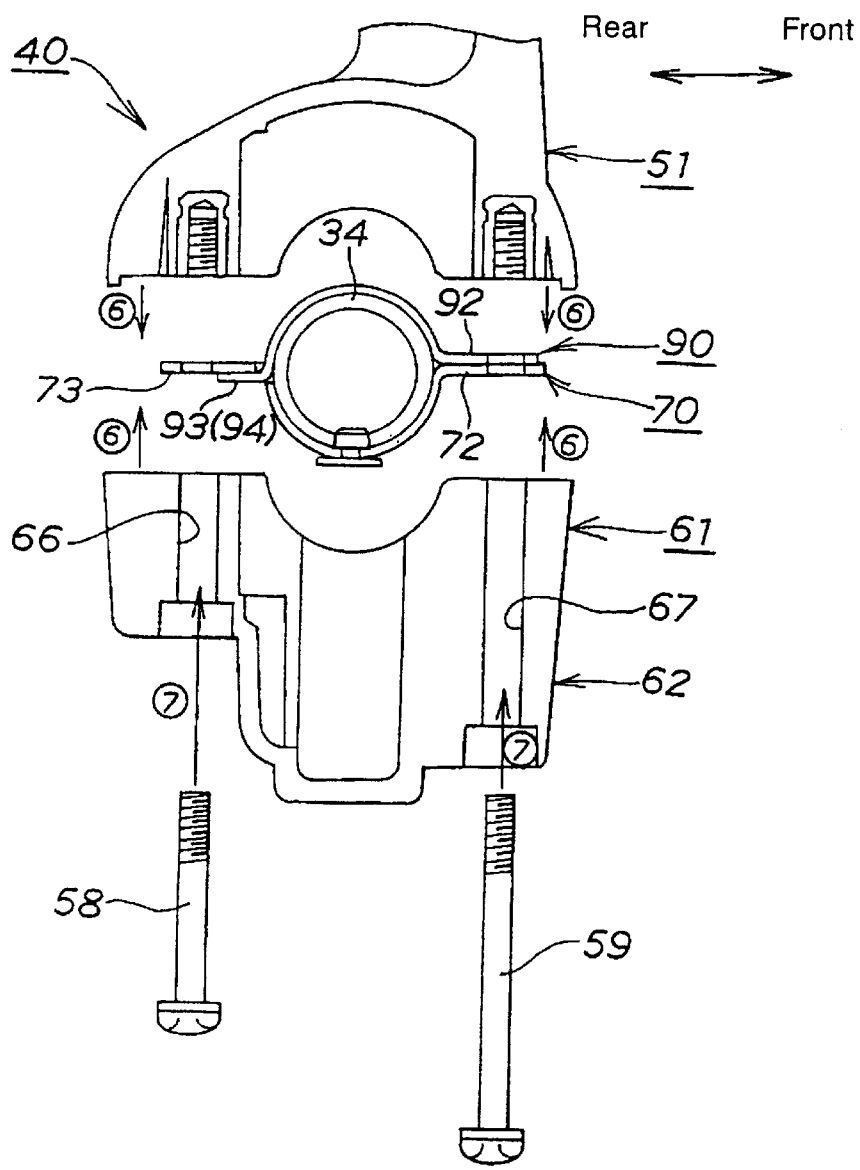

The second case half 61 is made of a resin and has circular portions 64 and 65 on the inner wall 62 and the outer wall 63 respectively, and through holes (shown in FIG. 7(b)) 66 and 67 for installation of the screws 58 and 59.

The inner and outer circular portions 64 and 65 are so formed so as to cover nearly half of the periphery (the lower half of the periphery) of the handlebar pipe portion 34.

Figure 5:
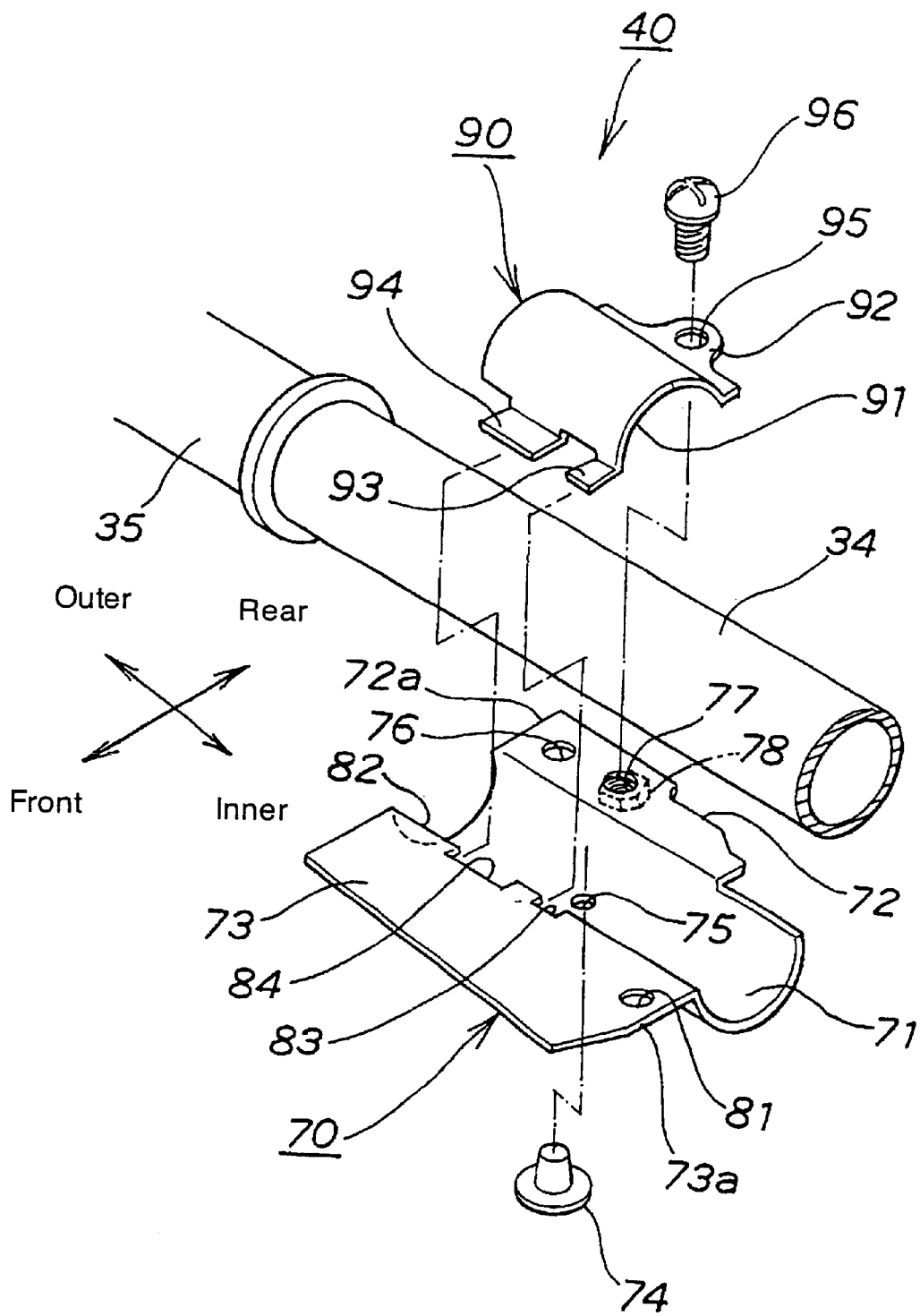
FIG. 5 is an enlarged view showing a major portion of the handlebar switch mounting structure according to the present invention.

FIG. 5 is an enlarged view showing a major portion of the handlebar switch mounting structure according to the present invention. The first bracket 70 consists of the circular portion 71 and the front and rear flange portions 72 and 73 as described above. The circular portion 71 can be attached on the lower half of the periphery of the handlebar pipe portion 34. The hole 75 is nearly at the center in which the lock pin 74 can be inserted.

The front flange portion 72 is formed approximately as a rectangular lug extending in the radial direction of the circular portion 71, and includes a screw hole 76 in the outer end 72a. A screw hole 77 is provided for attaching the second bracket 90 approximately at the center. A weld nut 78 is provided on the back side of the front flange portion 72.

The rear flange portion 73 is formed approximately as a rectangular lug extended in the radial direction of the circular portion 71, and includes a screw hole 81 in the inner end 73a. First and second insertion holes 83 and 84 are provided for attaching the second bracket 90 to the bent portion 82 between the circular portion 71 and the rear flange portion 73.

The second bracket 90 is provided with the circular portion 91, a front flange portion 92 is bent at the front end of the circular portion 91, and first and second lugs 93 and 94 are bent at the rear end of the circular portion 91. The circular portion 91 is so formed about a half of the length of the first bracket 70 so as to be attached on the remaining half of the periphery (i.e., the upper half of the periphery) of the handlebar pipe portion 34.

The front flange portion 92 is an ear extending in the radial direction of the circular portion 91, and includes a screw hole 95 for installing to the first bracket 70 nearly at the center.

The first lug 93 is a lug extend radially outwardly of the circular portion 91, and is a member which can be inserted into the first insertion hole 83 of the first bracket 70.

The second lug 94 is a lug extended radially outwardly of the circular portion 91, and is a member which can be inserted into the second insertion hole 84 of the first bracket 70.

The second bracket 90 can be integrally installed to the first bracket 70 by inserting the first and second lugs 93 and 94 of the second bracket 90 into the first and second insertion holes 83 and 84 of the first bracket 70, inserting the screw 96 into the screw hole 95 of the second bracket 90 and the screw hole 77 of the first bracket 70, and then by tightening to the weld nut 78.

Because of the structure wherein the first and second lugs 93 and 94 of the second bracket 90 are inserted into the first and second insertion holes 83 and 84 of the first bracket 70, it is possible to attach the first bracket 70 to the second bracket 90 simply by tightening one screw 96. Therefore, the first bracket 70 can be attached relatively easily to the second bracket 90, thereby enabling a decrease in the time to install the handlebar switch.

Next, the procedure for attaching the mounting structure for mounting the handlebar switch unit 40 will be explained.

Figure 6A:
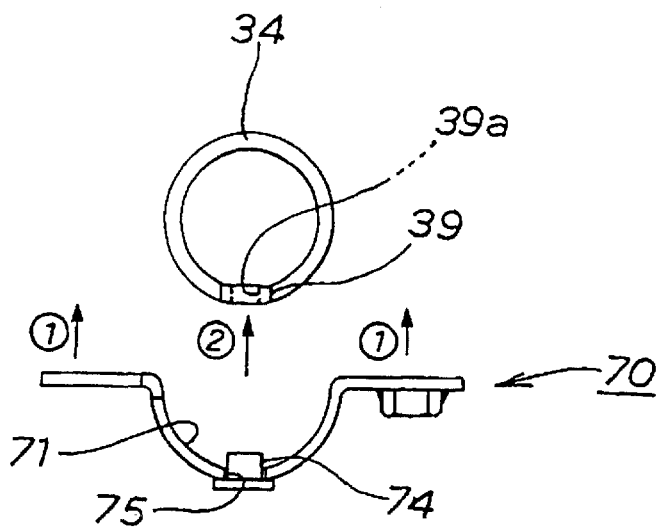
FIGS. 6(a), 6(b) and 6(c) are views explaining the first installation procedure for installing the handlebar switch mounting structure according to the present invention.
Figure 6B:
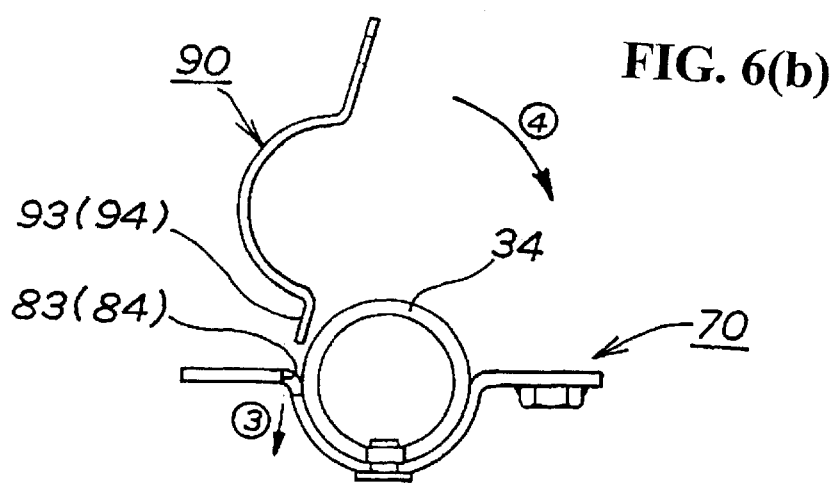
Figure 6C:
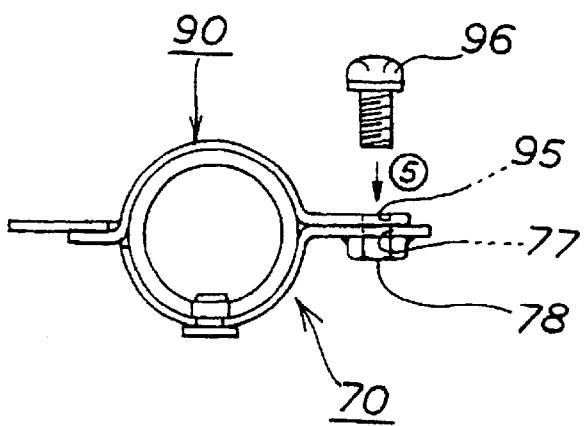

FIGS. 6(a) to 6(c) provide explanatory views for explaining the first installation procedure for installing the handlebar switch mounting structure according to the present invention.

In FIG. 6(a), the lock pin 74 is inserted into the hole 75 of the first bracket 70. The lock pin 74 is integrally installed to the hole 75 of the first bracket 70 by spot welding for example. In the present state, the first bracket 70 is moved in the direction of the arrow 1 enclosed in a circle. Then with the circular portion 71 placed on the lower half of the periphery of the handlebar pipe 34, the lock pin 74 is inserted into the hole 39a of the boss 39 as indicated by the arrow 2 enclosed in a circle.

Now, in this state, there exists some clearance between the lock pin 74 and the hole 39a and accordingly the first bracket 70 can slightly turn along the outer periphery of the handlebar pipe 37.

In FIG. 6(b), the first and second lugs 93 and 94 of the second bracket 90 are inserted into the first and second insertion holes 83 and 84 of the first bracket 70 as indicated by the arrow 3 enclosed in a circle. Subsequently, the second bracket 90 is attached on the handlebar pipe 34 as indicated by the arrow 4 enclosed in a circle.

Finally in FIG. 6(c), the screw 96 is inserted into the screw hole 95 of the second bracket 90 and the screw hole 77 of the first bracket 70 as indicated by the arrow 5 enclosed in a circle, then the screw 96 is tightened into the weld nut 78 of the fist bracket 70.

FIGS. 7(a) and 7(b) are provided as explanatory views for explaining the second installation procedure for installing the handlebar switch mounting structure according to the present invention.

In FIG. 7(a), the first bracket 70 and the second bracket 90 are mechanically joined by tightening the screw 96, securely fastening the handlebar pipe 34 by the circular portion 71 of the first bracket 70 and the circular portion 91 of the second bracket 90 and locking the circular portion 71 and the circular portion 91 to the handlebar pipe 34 with a frictional force.

Therefore a slight turn of the first bracket 70 resulting from the presence of the clearance between the lock pin 74 and the hole 39a can be restrained, thus firmly attaching the first bracket 70 and the second bracket 90 to the handlebar pipe 34.

In FIG. 7(b), with the front and rear flange portions 72 and 73 of the first bracket 70 (including, in more specifically, the front flange portion 92 of the second bracket 90 and the first and second insertion lugs 93 and 94) are held in a sandwiched manner, the first and second case halves 51 and 61 are joined as indicated by the arrow 6 enclosed in a circle.

Next, the screws 58 and 59 are inserted into the through holes 66 and 67 of the second case half 61 as indicated by the arrow 7 enclosed in a circle.

Figure 8:
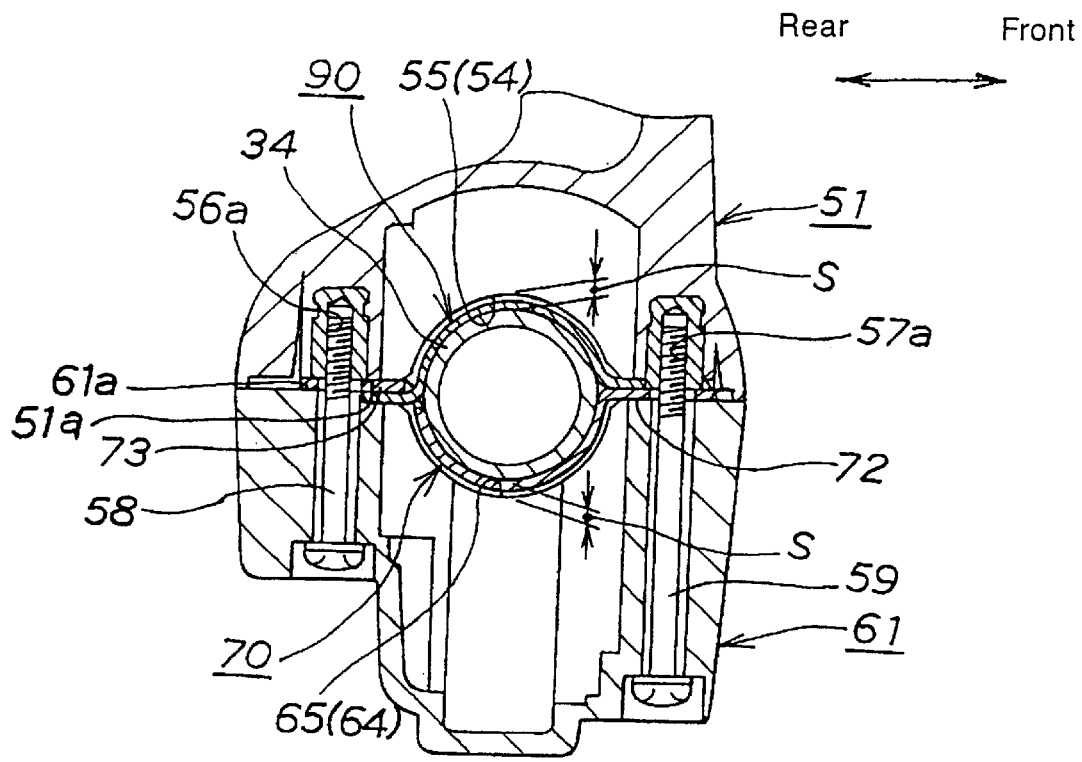
FIG. 8 is a view for explaining the third installation procedure for installing the handlebar switch mounting structure according to the present invention.

FIG. 8 is an explanatory view showing the third installation procedure for installing the handlebar switch mounting structure according to the present invention.

As the screws 58 and 59 are tightened into the internal threads 56a and 57a of the first case half 51, the first and second case halves 51 and 61 are mechanically joined to the front and rear flange portions 72 and 73, to thereby attach the first and second case halves 51 and 61 to the handlebar pipe 34 through the front and rear flange portions 72 and 73.

According to the mounting structure of the present invention, as described above, the first and second brackets 70 and 90 are firmly attached to the handlebar pipe 34 by thus locking with a frictional force as described above, and the first and second case halves 51 and 61 are installed by screws 58 and 59 to the front and rear flange portions 72 and 73 of the first bracket 70.

Accordingly, it is possible to provide a clearance S between the outer circular portion 55 of the first case body 51 and the upper half of the periphery of the handlebar pipe 34, and also a clearance S between the outer circular portion 65 of the second case body 61 and the lower half of the periphery of the handlebar pipe 34. Therefore, the opposite surface 51a of the first case body 51 can be reliably held on the front and rear flange portions 72 and 73 of the first bracket 70. And furthermore the opposite surface 61a of the second case body 61 can also be reliably held on the front and rear flange portions 72 and 73 of the first bracket 70.

Therefore, it is possible to reliably install the first and second case halves 51 and 61 to the front and rear flange portions 72 and 73, and to firmly install the first and second case halves 51 and 61 to the handlebar pipe 34.

It is also possible to provide a clearance S similarly to the outer circular portion 55 between the inner circular portion 54 (also shown in FIG. 3) of the first case body 51 and the upper half of the periphery of the handlebar pipe 34, and a clearance S similarly to the outer circular portion 65 between the inner circular portion 64 (also shown in FIG. 3) of the second case body 61 and the lower half of the periphery of the handlebar pipe 34.

In addition, since the first and second brackets 70 and 90 can be locked with a frictional force on the handlebar pipe 34, it is possible to prevent the rotation of the handlebar switch unit 40 which is likely to occur due to the presence of the clearance between the lock pin 74 and the hole 39a.

Therefore, it is unnecessary to firmly tighten the handlebar pipe 34 with the first and second case halves 51 and 61 as is required in a conventional art. It is, therefore, unnecessary to provide a substantial clearance between the first and second case halves 51 and 61 and firmly tighten the first and second case halves 51 and 61 with the screws 58 and 59. Consequently, it is possible to prevent deformation of the first and second case halves 51 and 61, whereby the external appearance of the handlebar switch can be improved.

Figure 9:
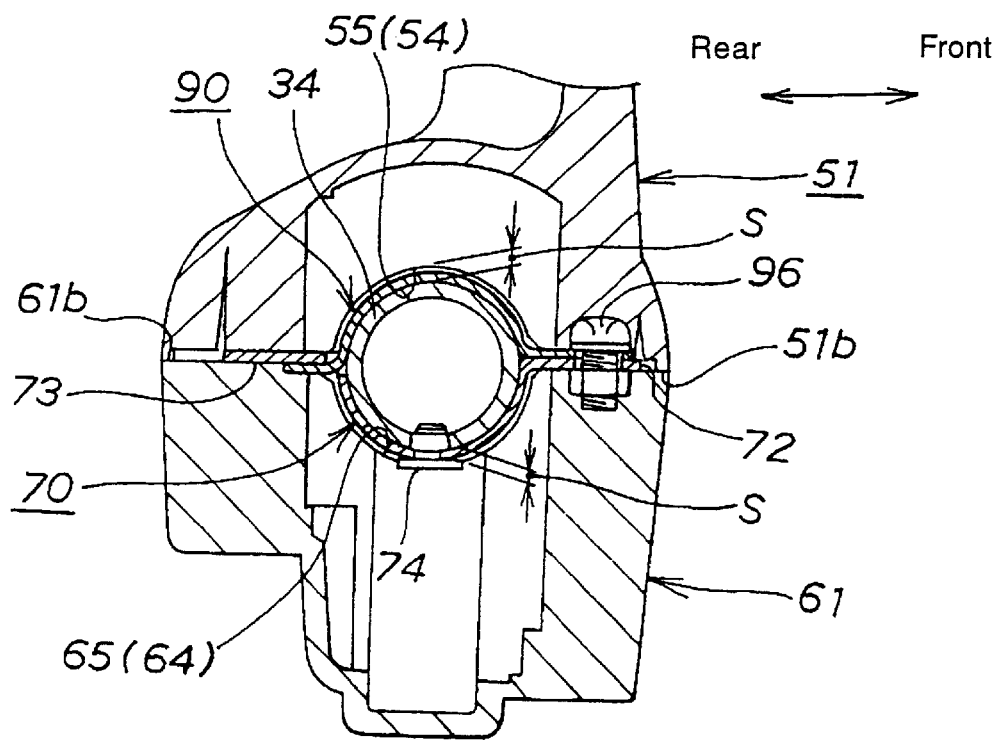
FIG. 9 is a view for explaining the fourth installation procedure for installing the handlebar switch mounting structure according to the present invention.
Figure 10:
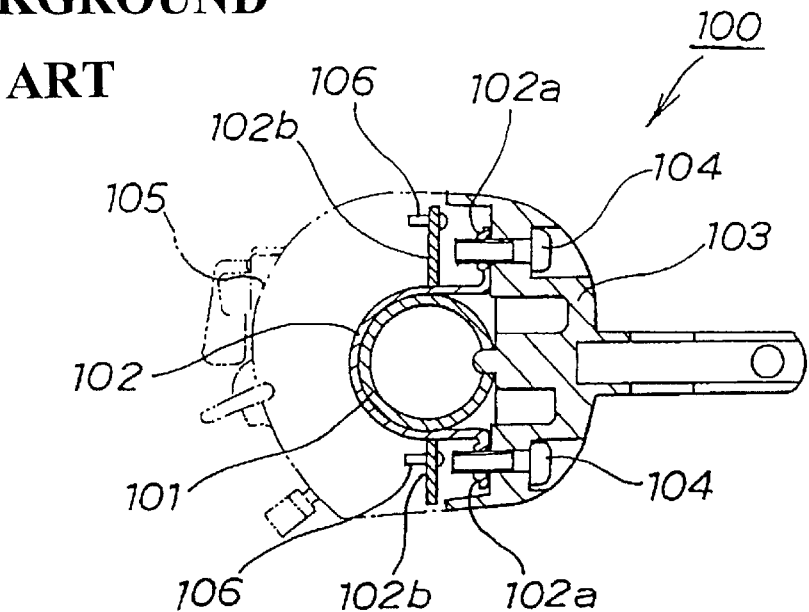
FIG. 10 is a sectional view showing a conventional handlebar switch mounting structure.
Figure 11:
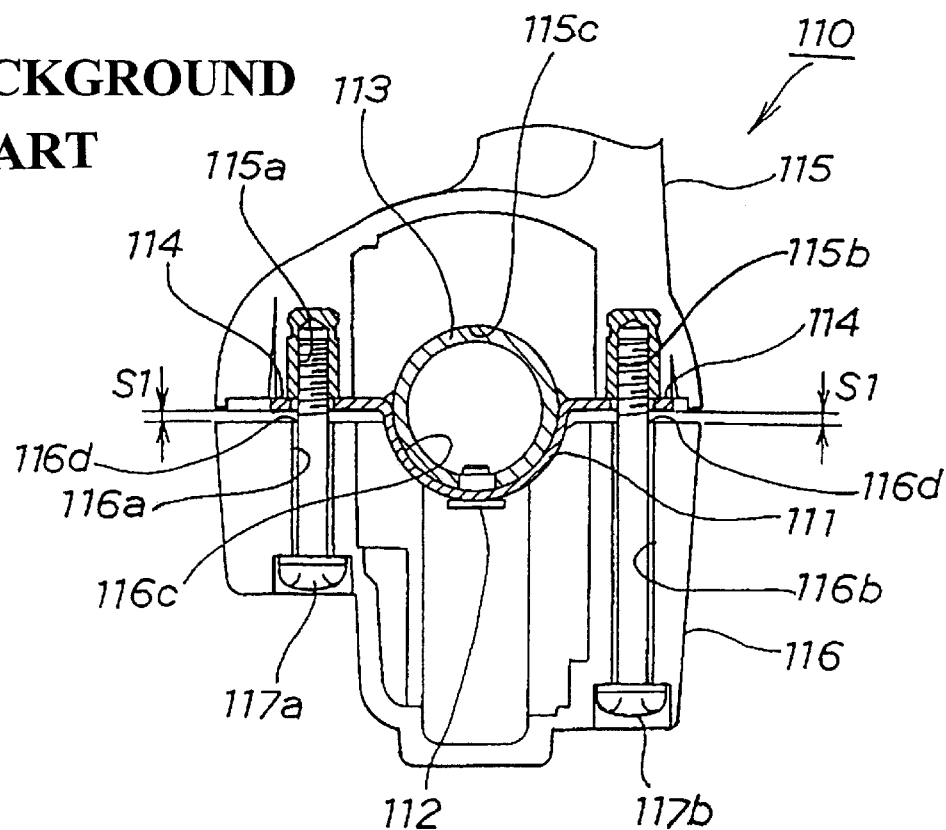
FIG. 11 is a sectional view showing a conventional handlebar switch mounting structure.

FIG. 9 is a view for explaining the fourth installation procedure for installing the handlebar switch mounting structure according to the present invention.

The first and second case halves 51 and 61 are mechanically joined to the front and rear flange portions 72 and 73 by the screws 58 and 59 (shown in FIG. 8). Thereafter, the first and second case halves 51 and 61 are locked by a frictional force to the handlebar pipe 34 through the front and rear flange portions 72 and 73, thereby reliably preventing the rotation of the first and second brackets 70 and 90 on the handlebar pipe 34.

Furthermore, since the outer opposite surfaces 51b and 61b of the first and second case halves 51 and 61 can be held in contact to eliminate the clearance therebetween, it is possible to further enhance the outward appearance.

In the above-described embodiment the procedure has been explained that the first and second lugs 93 and 94 of the second bracket 90 are inserted into the first and second insertion holes 83 and 84 of the first bracket 70 and are thereafter attached by the screw 96 wherein the front flange portion 92 and the front flange portion 72 of the first bracket 70 are secured together. The second bracket 90 can thus be installed relative to the first bracket 70. It is to be noted that a similar effect is obtainable if a rear flange portion is formed in place of the first and second lugs 93 and 94 of the second brackets 90 and attached by a screw to the rear flange portion 73 of the first bracket 70 in a manner similar to the front flange portion 92.

Also it should be noted that the above-described embodiment has been described as an example of the handlebar switch mounting structure for a motorcycle. The present invention is applicable also to other vehicles such as recreational three-wheeled vehicles.

The handlebar switch mounting structure of the present invention having the above-described configuration has the following advances. The first and second brackets can be firmly attached to the handlebar. In addition, the first and second case halves may be installed to the flange portion of the first bracket that is firmly mounted on the handlebar. Therefore, it is possible to securely install the first and second case halves to the handlebar through the first bracket.

Furthermore, it is unnecessary to tighten the handlebar by the first and second case halves because of the locking of the first and second brackets on the handlebar. It is, therefore, unnecessary to apply an unnecessarily high tightening force to the first and second case halves. Therefore, the first and second case halves can be prevented from being deformed. Consequently, the external appearance of the handlebar switch case can be further improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handlebar switch mounting structure for installation on a handlebar, comprising:

a case attached to one end of the handlebar, the case having a first case half and a second case half;

a first bracket including a circular portion adapted to be attached on approximately a half portion of a periphery of the handlebar, said first bracket having two flange portions;

a second bracket having at least a circular portion adapted to be attached on a remaining half of the periphery of the handlebar, said second bracket being joined to said first bracket installed on the handlebar thereby securing said first and second brackets to the handlebar, said second bracket having one flange portion, said first and second case halves being positioned with said flange portions therebetween, and said first and second case halves being attached to each other by two bolts that are offset from each other along a length of the handlebar, thus fixing the mounting structure to said one end of the handlebar; and wherein one of the flange portions of said first bracket includes an aperture with a threaded portion, an attachment member being positioned in an aperture in the flange portion of said second bracket for securing said first bracket relative to said second bracket.

2. The handlebar switch mounting structure according to claim 1, wherein said first and second case halves are made of resin.

3. The handlebar switch mounting structure according to claim 1, wherein one of the flange portions of said first bracket includes at least one lug insertion hole and said second bracket includes at least one lug projecting outwardly therefrom, wherein said at least one lug is adapted to be inserted into said at least one lug insertion hole for retaining one side of said first bracket relative to said second bracket.

4. The handlebar switch mounting structure according to claim 1, wherein one of said flange portions of said first bracket includes two lug insertion holes and said second bracket includes two lugs projecting outwardly therefrom, wherein said two lugs are adapted to be inserted into said two lug insertion holes for retaining one side of said first bracket relative to said second bracket.

5. The handlebar switch mounting structure according to claim 1, wherein said circular portion of said first bracket includes an aperture, and wherein said structure further includes a locking pin extending through said aperture for preventing rotation of said first bracket relative to the handlebar.

6. The handlebar switch mounting structure according to claim 1, said bolts extending through said second case half, said second case half being secured relative to said first case half and enclosing said flange portions of the first and second brackets therebetween.

7. The handlebar switch mounting structure according to claim 6, wherein said flange portions of the first bracket include apertures for said bolts to extend upwardly therethrough for securing said second case half and said first case half together, said bolts being tightened into internal threads of the first case half.

8. A handlebar switch mounting structure for installation on one end of a handlebar, the structure comprising:

a first case half and a second case half;

a first bracket including a first circular portion adapted to be attached on approximately a half portion of a periphery of the handlebar and a pair of flange portions projecting from both ends of said circular portion; and a second bracket having a second circular portion adapted to be attached on a remaining half of the periphery of the handlebar, said second bracket being joined to said first bracket installed on the handlebar, thereby securing said first and second brackets to the handlebar, said first and second case halves being positioned with said flange portions therebetween, said first and second case halves being attached to each other by bolts that are offset from each other along a length of the handlebar, thus fixing the structure to said one end of the handlebar;

wherein one of the flange portions of said first bracket includes an aperture with a threaded portion, an attachment member being positioned in an aperture in a corresponding flange portion of said second bracket for securing said first bracket relative to said second bracket.

9. The handlebar switch mounting structure according to claim 8, wherein said first and second case halves are made of resin.

10. The handlebar switch mounting structure according to claim 8, wherein one of said flange portions of said first bracket includes at least one lug insertion hole and said second bracket includes at least one lug projecting outwardly therefrom, wherein said at least one lug is adapted to be inserted into said at least one lug insertion hole for retaining one side of said first bracket relative to said second bracket.

11. The handlebar switch mounting structure according to claim 8, wherein one of said flange portions of said first bracket includes two lug insertion holes and said second bracket includes two lugs projecting outwardly therefrom; wherein said two lugs are adapted to be inserted into said two lug insertion holes for retaining one side of said first bracket relative to said second bracket.

12. The handlebar switch mounting structure according to claim 8, wherein said circular portion of said first bracket includes an aperture, and wherein said structure further includes a locking pin extending through said aperture for preventing rotation of said first bracket relative to the handlebar.

13. The handlebar switch mounting structure according to claim 8, said bolts extending through said second case half, said second case half being secured to said first case half and for enclosing said flange portions of the first bracket and a flange portion of the second bracket therebetween.

14. The handlebar switch mounting structure according to claim 13, wherein said flange portions of the first bracket include apertures for said bolts to extend upwardly therethrough for securing said second case half and said first case half together, said bolts being tightened into internal threads of the first case half.

* * * * *